United States Patent [19]

Carlstrom et al.

[11] 4,232,085
[45] Nov. 4, 1980

[54] FLEXIBLE POLYURETHANE FOAM HAVING A LOW FLAME SPREAD INDEX

[75] Inventors: William L. Carlstrom; Gary L. Maechtle, both of West Bend, Wis.

[73] Assignee: Freeman Chemical Corporation, Port Washington, Wis.

[21] Appl. No.: 66,448

[22] Filed: Aug. 14, 1979

Related U.S. Application Data

[63] Continuation-in-part of Ser. No. 930,412, Aug. 2, 1978, abandoned.

[51] Int. Cl.³ .................... B32B 5/20; C08G 18/14; B32B 27/40
[52] U.S. Cl. .................... 428/315; 428/310; 428/311; 521/51; 521/131; 521/906
[58] Field of Search .................... 521/51, 131, 906; 428/310, 311, 315

[56] References Cited

U.S. PATENT DOCUMENTS

| | | | |
|---|---|---|---|
| 3,259,593 | 7/1966 | Eichhorn | 521/906 |
| 3,574,164 | 4/1971 | Cyba | 521/906 |
| 3,705,127 | 12/1972 | Cyba | 521/906 |
| 3,716,516 | 2/1973 | Dombrow | 521/906 |
| 4,147,678 | 4/1979 | Mao et al. | 521/906 |

FOREIGN PATENT DOCUMENTS

| | | | |
|---|---|---|---|
| 889720 | 2/1962 | United Kingdom | 521/131 |
| 994087 | 6/1965 | United Kingdom | 521/131 |

OTHER PUBLICATIONS

Schmidt, Trans. J. Plastics Inst. Dec. 1965, pp. 247–255.

*Primary Examiner*—H. S. Cockeram
*Attorney, Agent, or Firm*—George E. Manias

[57] ABSTRACT

A flexible polyurethane foam having a low flame spread index is produced by combining polyol (preponderantly diol and/or triol) with polyisocyanate (preponderantly diisocyanate) in the presence of a foaming catalyst and a blowing agent. By combining at least 75% by weight of pentabromoethyl benzene, based upon the weight of the polyol, a flame spread index less than 150 can be achieved for the resulting foam in the ASTM test E-162-76. Significantly, polyurethane foams having a flame spread index less than 25 have been produced with this invention.

11 Claims, No Drawings

FLEXIBLE POLYURETHANE FOAM HAVING A LOW FLAME SPREAD INDEX

CROSS-REFERENCES TO RELATED APPLICATIONS

This application is a continuation-in-part of copending application Ser. No. 930,412, filed Aug. 2, 1978, now abandoned.

BACKGROUND OF THE INVENTION

1. Field of the Invention:

This invention relates to flexible polyurethane foam compositions and more particularly to compositions having a low flame spread index in ASTM test E-162-76.

2. Description of the Prior Art:

Flexible polyurethane foam is employed as upholstery cushioning material, for example, in the manufacture of armrests, instrument panel surfaces, seating materials, et cetera for aircraft, automobile and truck bodies. In general such upholstery cushioning may be "integral skin foam" which is prepared with a halogenated blowing agent, or "seating foam" which is a high resiliency flexible foam usually prepared with water as a blowing agent. For some installations, such upholstery cushioning material must exhibit a flame spread index less than 150 (arbitrary ratings) in ASTM test E-162-76. The prior art polyurethane foam compositions will not pass that test although, when covered with suitable fire-retardant upholstering materials (such as polyvinyl chloride films), the combination has been successful. Apart from the present composition, there are no known integral-skin, flexible polyurethane foam compositions which will pass the ASTM test E-162-76 with a rating less than 150. Thus the polyurethane foam compositions with a flame spread less than 25 are particularly unexpected.

In our copending patent application Ser. No. 930,412, the benefits of the present invention as applied to integral skin flexible polyurethane foam were described. Subsequently we have discovered that these same benefits can be obtained with cushioning foam, i.e., polyurethane foam having a high resiliency which is blown with water. We have been able to obtain flame spread ratings less than 25 under the ASTM Test E-162-76 with water blown flexible polyurethane foam compositions.

Many fire-retardant additives are known for use in polyurethane foam compositions. Pentabromoethyl benzene, the material employed in the present compositions, is known as a fire-retardant additive to polypropylene, polystyrene, ABS resins, polymethyl methacrylate.

SUMMARY OF THE INVENTION

A flexible polyurethane foam is prepared by combining polyol (predominantly diol and/or triol) with a stoichiometric equivalent of an organic polyisocyanate (predominantly diisocyanate) in the presence of a suitable polyurethane foam-forming catalyst such as triethylene diamine and in the presence of sufficient blowing agent to achieve the desired density in the resulting foam.

Where an integral skin flexible polyurethane foam is prepared, a halogenated alkane blowing agent is employed. Where a seating foam is prepared, the blowing agent is water. Usually seating foam will have a lower density than integral skin foam. Integral skin foam densities of 10 to 50 pounds per cubic foot are common. Seating foam usually has a density from 4 to 40 pounds per cubic foot. The applicable foam products will usually have a density of 4 to 50 pounds per cubic foot.

To the polyol ingredient is added at least 75% by weight, based on the weight of polyol, of pentabromoethyl benzene in powder form. It is important to maintain the pentabromoethyl benzene in suspension in the polyol by vigorous agitation immediately preceding admixing the polyol with the polyisocyanate for the foam generation. The flexible foam is prepared in an enclosed mold.

DESCRIPTION OF THE PREFERRED EMBODIMENT(S)

A flexible polyurethane foam composition includes an organic polyol, an organic polyisocyanate, a foam-forming catalyst, a blowing agent and pentabromoethyl benzene as a fire-retardant additive. The blowing agent may be a halogenated alkane or water.

Organic Polyol

In general, any organic polyol may be employed although the flexible foams require that the polyol ingredient be predominantly diol and/or triol. The organic polyol should have a suitable viscosity to allow for spraying or blending with the organic polyisocyanate. Typical polyols include alkylene oxide (especially, propylene oxide or ethylene oxide) adducts of propylene glycol, glycerine, ethylene glycol, trimethylol ethane, trimethylol propane, 1,4-butane diol; polyethylene glycol.

Organic Polyisocyanate

Any of the conventional organic polyisocyanates or prepolymers of organic polyisocyanates can be employed, so long as the material is predominantly diisocyanate. A preferred organic polyisocyanate, from a cost and performance standpoint, is a prepolymer of methylene bis(4-phenyl) diisocyanate and a diol and/or triol.

Halogenated Alkane Blowing Agents

The use of halogenated alkane blowing agents in polyurethane foams is well known. A preferred blowing agent is trichlorofluoro methane. The amount of blowing agent is determined by the desired density of the flexible polyurethane foam and also by the nature of the integral-skin which is formed in a closed mold foam-forming process.

Water Blowing Agent

Water is well known as a blowing agent in the preparation of flexible polyurethane foam, especially seating foam. Water reacts with some of the -NCO radicals to yield free carbon dioxide gas which forms the pores of the resulting foam.

Catalyst

Any of the conventional polyurethane foam-forming catalysts may be employed. Triethylene diamine is preferred as a catalyst in flexible foam formulations.

Fire-Retardant Additive

Pentabromoethyl benzene, a commercially available chemical, is the specific flame-retardant additive which has achieved a fire-retardant rating of less than 150 in ASTM test 162-76. The material is a peach color powder at room temperature. The material is added as a solid to the organic polyol prior to foam formulation.

Process

The polyol component, containing polyol, blowing agent, catalyst and pentabromoethyl benzene is mixed with the polyisocyanate component. The mixture is introduced into a mold for the desired integral-skin product (e.g., a cushion or an armrest). Techniques for developing integral skins in enclosed molds are well known.

EXAMPLE 1

Integral Skin Foam

The following polyol component was prepared.
79.1 pounds ethylene oxide capped polyether, having a hydroxyl number of 45;
6.75 pounds, 1,4-butane diol;
0.45 pounds triethylene diamine;
13.70 pounds trichlorofluoro methane;
100 pounds pentabromoethyl benzene.
200 pounds of the resin composition as described were combined with 37 pounds of methylene bis(4-phenyl)diisocyanate prepolymer having an NCO value of 22.6.

The two materials were combined in a mold to produce a flexible polyurethane foam having an integral-skin and having a density of 20 pounds per cubic foot. That foam, when subjected to the ASTM test E-162-76, had flame spread values of 3.09; 4.00; and 3.87 in three replicate tests.

EXAMPLE 2

Integral Skin Foam

The same product was produced except that only 50 pounds of pentabromoethyl benzene was employed and an additional 50 pounds of powdered alumina hydrate was incorporated into the organic polyol. The resulting flexible polyurethane foam had a flame spread rating of 253.8 in ASTM E-162-76.

EXAMPLE 3

Integral Skin Foam

The polyurethane foam of Example 1 was introduced into a mold which had been precoated with a sprayed-on finishing coat consisting of a one component urethane coating having a thickness of 1 to 3 mils. The samples again were prepared at 20.0 pounds per cubic foot overall density. Those panels dripped extensively in the flame spread test and did not achieve a flame spread rating less than 150, ASTM E-162-76, when the tests were properly conducted.

EXAMPLE 4

Seating Foam

The following ingredients were combined to prepare a polyol mixture:
94.16 pounds of a triol having a molecular weight of 4500, being the ethylene oxide and propylene oxide adduct of glycerine
2.75 pounds water
2.0 pounds catalyst consisting of a mixture of amines
1.0 pound surfactant and cell size regulator.

The isocyanate ingredient was prepared by combining
20.75 pounds of toluene diisocyanate (80% 2,4-TDI; 20% 2,6-TDI)
13.5 pounds triol, 4500 molecular weight, the ethylene oxide and propylene oxide adduct of glycerine
20.75 pounds polymeric isocyanate having an NCO value 31.5 and a functionality 2.7
45.0 pounds polymeric isocyanate having an NCO value 31.5 and a functionality 2.2.

In order to prepare a seating foam 100 parts of the polyol mixture was combined with 50 parts by weight of the isocyanate mixture. The resulting foam was poured into a test pillow mold 21 inches by 21 inches by 4 inches. A pillow was obtained having the properties set forth in Table 1.

EXAMPLE 5

Seating Foam

Example 4 was repeated except that the foam forming composition included 100 parts of the polyol mixture, 112 parts pentabromoethylbenzene and 50 parts of the isocyanate mixture. The pentabromoethylbenzene was premixed with the polyol mixture to facilitate the mixing. A pillow was prepared in the same mold as described in Example 4. The properties of the resulting pillow are set forth in the following Table 1.

TABLE 1

|  | Example 4 Cushion | Example 5 Cushion |
| --- | --- | --- |
| Flame Spread Index ASTM E-162-76 | 3054 | 4.03 |
| Molded Density (pounds per cubic foot) | 3.15 | 6.90 |
| Indentation Load Deflection ASTM-D-2406 25% (pounds) | 24 | 43 |

It will be observed that the flame spread index of a typical seating foam was reduced from 3054 to a value less than 25, specifically 4.03, by practicing the present invention as described in Example 5.

We claim:

1. A foam-forming composition for producing a flexible polyurethane foam having a low flame spread rating comprising:
    organic polyol consisting preponderantly of diol and/or triol;
    a foam-forming catalyst;
    a blowing agent;
    at least 75% (based upon the weight of said polyol) of pentabromoethyl benzene; and
    sufficient organic polyisocyanate, consisting predominantly of diisocyanate, to combine stoichiometrically with the said polyol to produce a flexible polyurethane foam.

2. A flexible polyurethane foam having a density of 4 to 50 pounds per cubic foot, fabricated by forming a polyurethane foam from the composition of claim 1 in an enclosed mold.

3. The foam-forming composition of claim 1 wherein the said catalyst is triethylene diamine.

4. The flexible polyurethane foam of claim 2 having a flame spread index (ASTM E-162-76) less than 150.

5. The flexible polyurethane foam of claim 4 having a flame spread index (ASTM E-162-76) less than 25.

6. A foam-forming composition for producing an integral-skinned, flexible polyurethane foam having a low flame spread rating comprising:
- organic polyol consisting preponderantly of diol and/or triol;
- a foam-forming catalyst;
- halogenated alkane blowing agent;
- at least 75% (based upon the weight of said polyol) of pentabromoethyl benzene; and
- sufficient organic polyisocyanate, consisting predominantly of diisocyanate, to combine stoichiometrically with the said polyol to produce a flexible polyurethane foam.

7. An integral-skinned polyurethane foam having a density of 10 to 50 pounds per cubic foot; having an integral-skin; fabricated by forming a polyurethane foam from the composition of claim 6 in an enclosed mold.

8. The integral-skinned polyurethane foam of claim 7 having a flame spread index (ASTM E-162-76) less than 25.

9. A foam-forming composition for producing a high resiliency seating foam of flexible polyurethane having a low flame spread rating comprising:
- organic polyol consisting preponderantly of diol and/or triol;
- a foam-forming catalyst;
- water as a blowing agent;
- at least 75% (based upon the weight of said polyol) of pentabromoethyl benzene; and
- sufficient organic polyisocyanate, consisting predominantly of diisocyanate, to combine stoichiometrically with the said polyol to produce a flexible polyurethane foam and to react with at least a portion of said water to generate carbon dioxide.

10. A flexible seating polyurethane foam having a density of 4 to 40 pounds per cubic foot, fabricated by forming a polyurethane foam from the composition of claim 6 in an enclosed mold.

11. The flexible seating polyurethane foam of claim 10 having a flame spread index (ASTM E-162-76) less than 25.

* * * * *